June 2, 1953     E. A. FARR     2,640,600
TOAST RACK
Filed July 22, 1949
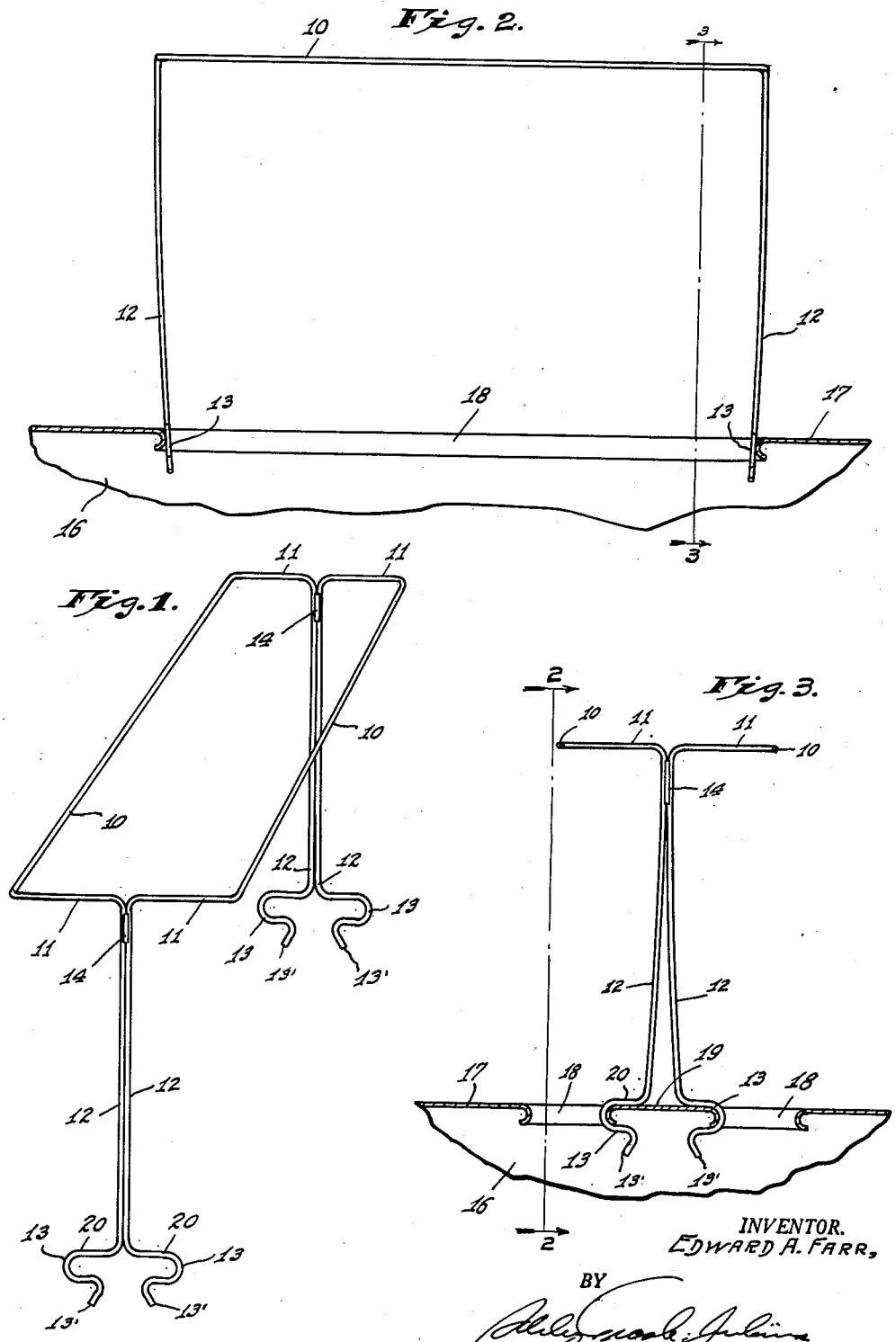
INVENTOR.
EDWARD A. FARR,
BY
ATTORNEYS.

Patented June 2, 1953

2,640,600

UNITED STATES PATENT OFFICE 2,640,600

TOAST RACK

Edward A. Farr, Columbus, Ind., assignor to Arvin Industries, Inc., a corporation of Indiana Application July 22, 1949, Serial No. 106,273

1 Claim. (Cl. 211—106)

This invention relates to a device for keeping toast warm after it has been toasted in an electric toaster. It is the object of the invention to produce such a device which can be simply and economically manufactured and readily attached to or removed from an electric toaster.

A common form of electric toaster intended for domestic use is adapted for the toasting of two slices of bread simultaneously and is provided with a housing or casing having in its top a pair of parallel slots through which the bread slices to be toasted are inserted. In incorporating my invention in a toaster of that type, I employ a frame conveniently made of wire and having a toast-supporting upper portion and two legs depending from the end thereof. At the foot of each leg the latter is formed with a pair of opposed hook-like portions which can be separated and inserted respectively into the bread-receiving slots of the toaster-casing, the resilience of the frame causing the two hook-like portions to engage the sides of the bread slots and support the device.

The accompanying drawing illustrates the invention:

Fig. 1 is a perspective view of a toast rack removed from association with a toaster; Fig. 2 is a vertical section on the line 2—2 of Fig. 3 showing the warmer applied to a toaster; and Fig. 3 is a vertical section on the line 3—3 of Fig. 2.

The device illustrated in the drawing comprises a pair of identical wires each formed to provide an elevated portion of a general U-shape having an intermediate portion 10 and parallel end portions 11. Each end portion 11 is continuous with a downwardly extending leg-forming portion 12 generally perpendicular to the plane of the top-forming portions 10—11. Near its bottom, each leg-forming portion 12 is bent to provide a hook 13.

To complete a toast-warming device two of the wires formed as above described are placed in opposed relation as shown in Fig. 1, and the two adjacent legs 12 are secured together near their upper ends, as by the spot welding 14 indicated in the drawing. In this condition, the intermediate portions 10 and the end portions 11 of each wire are co-planar and form, in effect, an open frame capable of supporting one or more slices of toast in horizontal position. The legs 12 extend downwardly in close parallel relation with the hooks at their lower ends opening toward each other.

A toaster suitable for use with the warmer illustrated includes a casing 16 having in its upper wall 17 a pair of slots 18 through which bread slices may be inserted to be toasted. In applying the warmer to the toaster, the hooks 13 in each end of the warmer are separated and inserted through the slots 18, as will be clear from Fig. 3. The hooks are so proportioned that the strip 19 of casing-metal between the slots 18 will prevent the leg-forming wire-portions 12 from returning to their normal parallel relation illustrated in Fig. 1. As a result, the hooks resiliently grip the sides of the strip 19 and hold the toast-supporting portion 10—11 of the warmer in a horizontal position above the top of the toaster.

The legs 12 are made long enough so that the warmer-portion 10—11 or any toast supported thereon does not interfere with the insertion of bread or removal of toast through the slots 18. Desirably, the wires constituting the warmer are so shaped that the distance between the lower ends of the legs 12—12 is normally somewhat greater than the length of the slots 18. As a result, the legs 12—12 will be bent inwardly toward each other somewhat, as indicated in Fig. 2, when the warmer is in place. This bending of the legs toward each other holds the warmer in fixed position longitudinally of the slots 18 while the separation of the leg-forming portions 12 of each leg locates the warmer transversely of the slots.

To facilitate application of the warmer to the toaster, the extreme ends of the wires may be bent, as indicated at 13' in Figs. 1 and 3, to diverge downwardly with respect to each other. The upper side 20 of each hook desirably conforms to the cross-sectional shape of the strip 19 in order to provide a more stable support for the warmer.

I claim as my invention:

A toast rack, comprising two similarly shaped resilient wires each bent to provide an upper portion having a side and two ends, the two ends being bent to provide downwardly extending portions, the two wires being placed with their upper portions coplanar and with the downwardly extending portions juxtaposed in pairs, the downwardly extending portions of each pair being secured together adjacent their upper ends and being provided at their lower ends with opposed hooks.

EDWARD A. FARR.

References Cited in the file of this patent

UNITED STATES PATENTS

| Number | Name | Date |
|---|---|---|
| 354,261 | Smith | Dec. 14, 1886 |
| 759,025 | Schiele | May 3, 1904 |
| 846,911 | Crump | Mar. 12, 1907 |
| 1,714,536 | Wooderson | May 28, 1929 |
| 1,734,532 | Sacerdote | Nov. 5, 1929 |
| 2,315,271 | Porter | Mar. 30, 1943 |
| 2,493,222 | Braucht | Jan. 3, 1950 |